Aug. 2, 1927.
F. PEACOCK
1,637,454
BUMPER BAR AND REAR FENDER FOR AUTOMOBILES
Filed Nov. 24, 1925
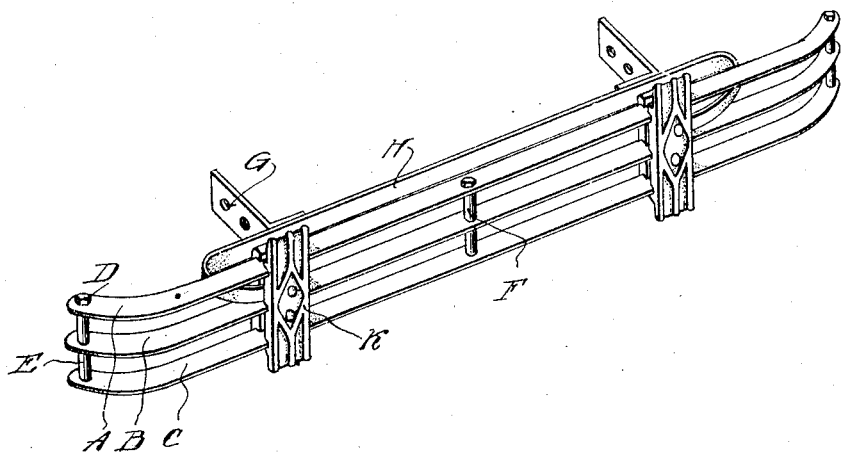
INVENTOR:
Frank Peacock
BY: Ruege, Boyce & Bakelaw
ATTORNEYS.

Patented Aug. 2, 1927.

1,637,454

UNITED STATES PATENT OFFICE.

FRANK PEACOCK, OF CROYDON, NEAR SYDNEY, NEW SOUTH WALES, AUSTRALIA.

BUMPER BAR AND REAR FENDER FOR AUTOMOBILES.

Application filed November 24, 1925, Serial No. 71,042, and in Australia December 10, 1924.

This invention relates to bumper bars and rear fender bars for automobiles, for protecting the same from injury by forward or rearward contact with other objects. Heretofore a variety of such devices have been used, all, however, having the common feature of one or more flat bars with their flat surfaces disposed vertically so that the bars are presented flatwise towards any object which may strike or be struck by them, and they are therefore free to flex, and must be made of sufficient section to resist stresses to which they are subjected in use; these bars are sometimes crossed and in many cases are reinforced with other bars arranged springwise rearward of them, but always so that the system of bars is more or less flexible. In certain cases rigid pipe bars, angle iron, and channel iron bars have been used for the like purpose, but these latter types of bar are objectionable in appearance and unless made in a very heavy type of construction they are readily bent and deformed and fail to offer the necessary security against injury to the vehicle.

According to the present invention the bumper bars for automobiles consist of a plurality of bars in parallel order, a short distance apart, and with their flat sides disposed in horizontal planes. The several bars (three bars are usually used) are secured together to form a grating-like structure by means of through bolts and thimbles and preferably also by clamping devices of substantial dimensions. At their ends the bars are bent backwards edgewise to offer a curved line; this curving of the ends of bumper bars is a commonplace feature in known constructions and no novelty is claimed in respect of it intrinsically.

Similar bumper bars may be used at the rear end of the car as well as at the forward end of it, but in cases where the spare tire or spare wheel is carried across the back of the tonneau, this wheel or tire may be utilized as part of the protective device. In this case the middle portion of the back bumper is omitted and the two end portions only of it are used; these short end pieces form curved guards which protect the rear wings and the rear covers of the automobile body; they lie directly behind the rear wings and more or less above their back ends. These wing fenders are not mutually supported and it is necessary therefore that their attachments to the rear dumb irons be strutted or gusset stayed. The detail of the reinforcement may be modified according to circumstances, but will generally take the form of gusset stays which may be integral with the clamping members which are bolted up to the dumb irons.

The setting of the bars edgewise instead of flatwise not only produces a more serviceable bumper, but offers better appearance to the fitment.

In the accompanying drawing:—

The drawing is a perspective view of a bumper for the front or rear of a car, constructed according to the present invention and mounted rearwardly on a carrier spring member attachable by brackets to the dumb irons.

Referring to the drawing, A, B and C are flat bars disposed horizontally with their ends bent backwardly and secured together by frame bolts D and thimbles E to hold them in spaced relation. Similar spacing bolts and thimbles F may be used centrally or at other intermediate positions in the length of the bars. G are brackets of any known type attachable to the dumb irons to which they are structurally adapted in each case. These brackets may be of the buffer type, but when used in connection with the carrier spring or springs H which are set edgewise, that is, with their flats in vertical plane, it is not necessary that any buffer arrangements should be used in the brackets G. Forwardly returned ends of the carrier springs H are secured in the clamp pieces K which secure the three bars A, B and C in spaced relation as well as fixing them to the supporting spring or springs H. The clamps K may be of ornate design.

What I claim as my invention and desire to secure by Letters Patent is:—

A bumper for a motor vehicle comprising a plurality of flat steel bars disposed with their flat sides in horizontal planes and having their ends curved edgewise, thimbled bolts securing said bars spaced apart and parallel with each other to form a vertical rack, a flat steel carrier bar having forwardly looped ends disposed edgewise rearwardly of said flatwise bars and adapted to be secured to the vehicle frame, and clamps embracing the ends of said carrier bar and said flatwise bars and having portions extending between the flatwise bars for maintaining them spaced apart.

In testimony whereof I affix my signature.

FRANK PEACOCK.